US009432707B2

(12) United States Patent
Cognault et al.

(10) Patent No.: US 9,432,707 B2
(45) Date of Patent: Aug. 30, 2016

(54) METHOD OF FORMATTING A VIDEO STREAM FOR MOBILE TERMINALS

(71) Applicant: France Brevets, Paris (FR)

(72) Inventors: Marc Cognault, Thorigne-Fouillard (FR); Franck Le Mouel, Erce pres Liffre (FR); Jean-Yves Quintard, Betton (FR)

(73) Assignee: Harmonic, San Jose, CA (US)

( * ) Notice: Subject to any disclaimer, the term of this patent is extended or adjusted under 35 U.S.C. 154(b) by 0 days.

(21) Appl. No.: 14/433,401

(22) PCT Filed: Oct. 3, 2013

(86) PCT No.: PCT/EP2013/070602
§ 371 (c)(1),
(2) Date: Apr. 3, 2015

(87) PCT Pub. No.: WO2014/053583
PCT Pub. Date: Apr. 10, 2014

(65) Prior Publication Data
US 2015/0264409 A1 Sep. 17, 2015

(30) Foreign Application Priority Data
Oct. 5, 2012 (FR) ..................................... 12 02664

(51) Int. Cl.
| H04N 21/236 | (2011.01) |
| H04N 21/2662 | (2011.01) |
| H04N 21/414 | (2011.01) |
| H04H 20/42 | (2008.01) |
| H04H 60/07 | (2008.01) |

(52) U.S. Cl.
CPC .......... *H04N 21/236* (2013.01); *H04H 20/426* (2013.01); *H04H 60/07* (2013.01); *H04N 21/2662* (2013.01); *H04N 21/41407* (2013.01)

(58) Field of Classification Search
CPC .......... H04N 21/236; H04N 21/2662; H04N 21/41407; H04H 20/426; H04H 60/07
See application file for complete search history.

(56) References Cited

U.S. PATENT DOCUMENTS

| 2007/0274340 A1* | 11/2007 | Raveendran ... H04N 21/234354 370/468 |
| 2008/0225900 A1* | 9/2008 | Henriksson ............ H04H 20/65 370/509 |
| 2009/0252256 A1* | 10/2009 | Yousef ............... H04N 21/6405 375/299 |

FOREIGN PATENT DOCUMENTS

| EP | 0402973 A1 | 12/1990 |
| WO | 2008110920 A2 | 9/2008 |
| WO | 2009028851 A1 | 3/2009 |

OTHER PUBLICATIONS

Advanced Television Systems Committee, "ATSC Mobile DTV Standard, Part 2—RF/Transmission System Characteristics", Oct. 15, 2009, pp. 1-94.

*Primary Examiner* — Randy Flynn
(74) *Attorney, Agent, or Firm* — Meagher Emanuel Laks Goldberg & Liao, LLP

(57) ABSTRACT

Method of formatting a stream of data for mobile terminals according to a series of frames which comply with the ATSC-MH standard or with a standard which is upward compatible with ATSC-MH, a frame comprising a predetermined number of slots, each slot being able to be allocated to the transport of data associated with a service, said method comprising a step of defining a slots allocation pattern making it possible to meet a total bitrate need required for the services for a set, called a super frame, grouping together M frames, M being greater than 1, consisting in:
  Allocating a minimum number N of slots for each frame of a super frame as a function of the total bitrate need and of the bitrate allocated to a slot,
  Allocating an additional slot in a predetermined number p of frames of a super frame, so as to comply with the total bitrate need with a minimum bitrate stepsize equal to the bitrate allocated to a slot.

10 Claims, 7 Drawing Sheets

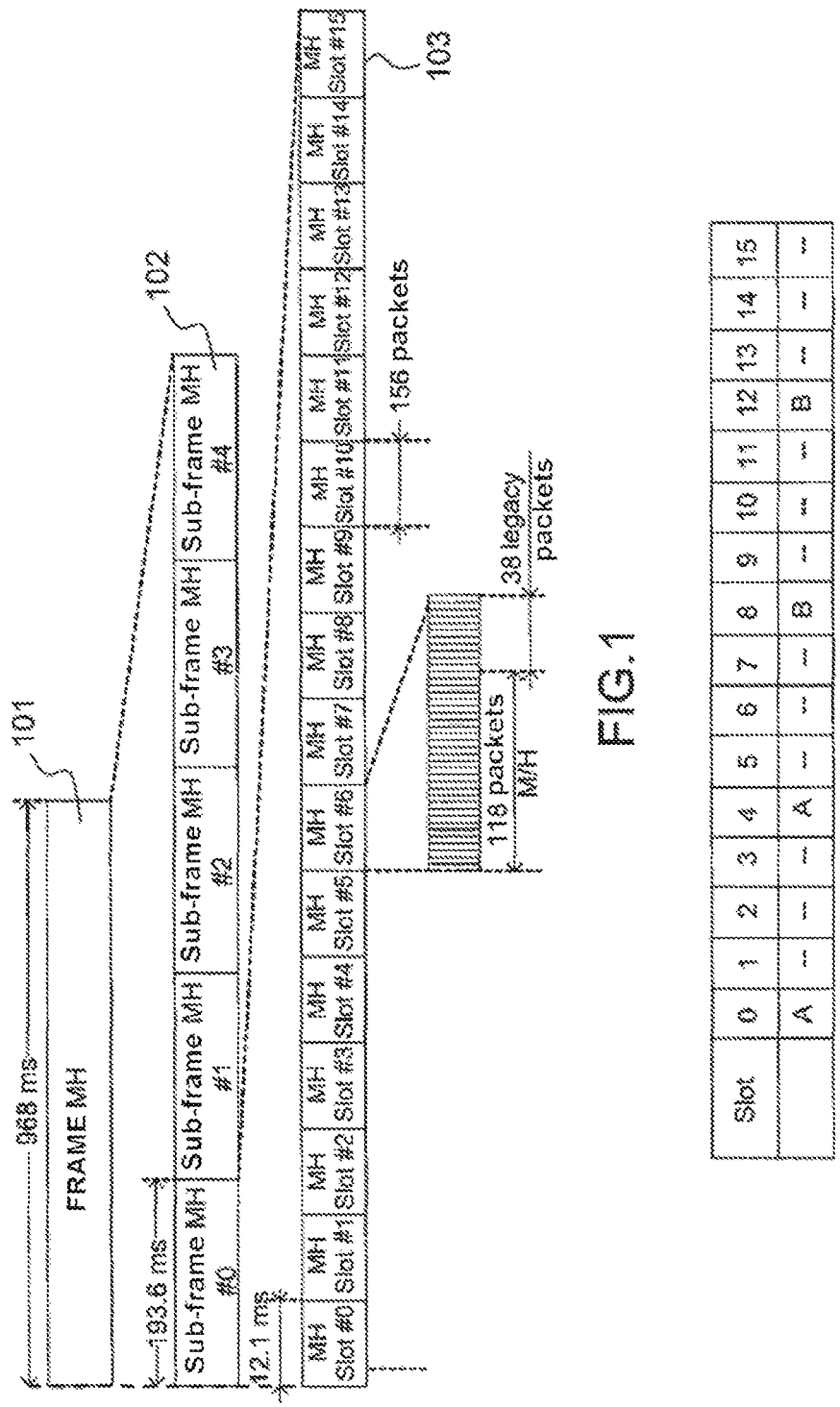

| Frame M/H | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | A | - | - | - | A | - | - | - | B | - | - | - | B | - | - | - |
| 2 | A | - | - | - | A | - | - | - | B | - | - | - | B | - | - | - |
| 3 | A | - | - | - | A | - | - | - | B | - | - | - | B | - | - | - |
| 4 | A | - | - | - | A | - | - | - | B | - | - | - | B | - | - | - |
| 5 | A | - | - | - | A | - | - | - | B | - | - | - | B | - | - | - |
| 6 | A | - | - | - | A | - | - | - | B | - | - | - | B | - | - | - |

FIG.4a

| Frame M/H | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | A | - | - | - | A | - | - | - | B | - | - | - | - | - | - | - |
| 2 | A | - | - | - | B | - | - | - | B | - | - | - | - | - | - | - |
| 3 | A | - | - | - | B | - | - | - | - | - | - | - | - | - | - | - |
| 4 | A | - | - | - | A | - | - | - | B | - | - | - | - | - | - | - |
| 5 | A | - | - | - | B | - | - | - | B | - | - | - | - | - | - | - |
| 6 | A | - | - | - | B | - | - | - | - | - | - | - | - | - | - | - |

FIG.4b

| Frame M/H | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | A | - | - | - | A | - | - | - | A | - | - | - | - | - | - | - |
| 2 | A | - | - | - | B | - | - | - | B | - | - | - | - | - | - | - |
| 3 | B | - | - | - | B | - | - | - | - | - | - | - | - | - | - | - |
| 4 | A | - | - | - | A | - | - | - | A | - | - | - | - | - | - | - |
| 5 | A | - | - | - | B | - | - | - | B | - | - | - | - | - | - | - |
| 6 | B | - | - | - | B | - | - | - | - | - | - | - | - | - | - | - |

FIG.6c

METHOD OF FORMATTING A VIDEO STREAM FOR MOBILE TERMINALS

FIELD OF THE INVENTION

The present invention relates to a method of formatting a video stream for mobile terminals. It applies in particular to the ATSC-MH standard used for the broadcasting of televisual contents on mobile terminals, for examples telephones, laptop computers or digital tablets.

BACKGROUND OF THE INVENTION

The "Advanced Television Systems Committee-Mobile/Handheld" standard, commonly designated with the aid of the initials ATSC-MH, and referenced under the number ATSC A/153, is an upward compatible extension of the ATSC digital terrestrial television standard. It makes it possible to transport data while taking account of constraints specific to wireless transmissions. An ATSC-MH stream comprises a series of frames termed M/H frames, able to transport jointly, on the one hand so-called "legacy" data, that is to say data intended for conventional terrestrial receivers, and on the other hand data intended for mobile terminals.

As illustrated in FIG. 1, an M/H frame 101 is spread over a duration of 968 ms and is composed of 5 sub-frames 102. Each sub-frame is split into 16 temporal notches 103 called "slots", a slot comprising 156 TS ("Transport Stream") packets of 188 bytes each. A slot may be assigned to the transport of legacy data exclusively and therefore comprise 156 TS packets of legacy data, or else assigned to the transport of 118 packets dedicated to mobiles, the other 38 packets being reserved for legacy data. Furthermore, the standard prescribes that the allocation of the slots in each sub-frame of one and the same frame be identical. Consequently, when a sub-frame slot is allocated to a service, there are 5 slots of the MH frame which are allocated to this service (one slot for each of the 5 sub-frames). For the sake of simplification, the expression "allocation of a slot to a service" is understood to mean the fact that this slot is allocated to the transport of data related to this service.

FIG. 2 presents an example according to the prior art of allocating slots in an M/H frame. For the sake of clarity, the allocation of the slots to the various services is represented by a single sub-frame, the other four sub-frames, not represented, of the M/H frame being assigned an identical allocation of slots. The 16 slots of a sub-frame are numbered from 0 to 15. In the example of FIG. 2, two services—also dubbed "parade" in the ATSC-specific terminology—each occupy two slots, the first service A occupying slots 0 and 4, the second service B occupying slots 8 and 12. The order of allocation of the slots in the sub-frames which has been defined by the standard is as follows: slot 0, slot 4, slot 8, slot 12, slot 2, slot 6, slot 10, slot 14, slot 1, slot 5, slot 9, slot 13, slot 3, slot 7, slot 11, and slot 15.

Conventionally, an entity for formatting the ATSC-MH stream performs an allocation of slots on a pattern consisting of a frame. Stated otherwise, it chooses an allocation scheme which repeats from one frame to another, so that if the bitrate allocated to the first service A must be increased, the entity allocates an additional slot per sub-frame, thereby corresponding to a bitrate increase of the order of 1 Mbit/s (five new slots allocated per M/H frame, at a rate of 118 packets of 188 bytes per slot). This increase is relatively heavy and may be excessive in regard to the actual bitrate needs. By way of illustration, if the frames of a stream are formatted according to the scheme illustrated in FIG. 2, then the input bitrate associated with each of the services A and B is of the order of 2 Mbits/s. If the bitrate associated with the first service A must be heightened to 2.1 Mbits/s to satisfy the quality required by this service, then an additional slot per sub-frame must be allocated, thereby hoisting the bitrate to 3 Mbits/s for service A. As a result, the 900 Kbits/s allocated over and above the 2.1 Mbits/s are unused.

An aim of the invention is to prevent losses of useful bitrate from occurring in a stream of the ATSC-MH type because of the formatting of the M/H frames. For this purpose, the subject of the invention is a method of formatting a stream of data for mobile terminals according to a series of frames which comply with the ATSC-MH standard or with a standard which is upward compatible with ATSC-MH, a frame comprising a predetermined number of slots, each slot being able to be allocated to the transport of data associated with a service, the method comprising a step of allocating the slots to the various services to be transported, characterized in that it performs said allocating step on a set grouping together M frames, M being greater than 1, so that at least two frames from among the M frames comprise a different number of slots associated with one and the same service.

The method according to the invention makes it possible to adapt, in a stream of the ATSC-MH type, the bitrate allocated to the data intended for mobile terminals in a finer manner, and thus to avoid the overly large jumps in bitrate responsible for the losses experienced in the prior art.

SUMMARY OF THE INVENTION

The subject of the invention is a method of formatting a stream of data for mobile terminals according to a series of frames which comply with the ATSC-MH standard or with a standard which is upward compatible with ATSC-MH, a frame comprising a predetermined number of slots, each slot being able to be allocated to the transport of data associated with a service, said method being characterized in that it comprises a step of defining a slots allocation pattern making it possible to meet a total bitrate need required for the services for a set, called a super frame, grouping together M frames, M being greater than 1, consisting in:
  Allocating a minimum number N of slots for each frame of a super frame as a function of the total bitrate need and of the bitrate allocated to a slot,
  Allocating an additional slot in a predetermined number p of frames of a super frame, so as to comply with the total bitrate need with a minimum bitrate stepsize equal to the bitrate allocated to a slot.

According to an implementation of the formatting method according to the invention, the method comprises the following steps:
  determining the bitrate needs for each service to be transmitted in the stream,
  identifying, as a function of the total bitrate need required for the set of said services, slots to be allocated to the transport of data of at least one of said services in each frame of a set of M frames;
  allocating each of said identified slots to the transport of data of one of said services.

According to an implementation of the formatting method according to the invention, the step of identifying the slots to be allocated comprises:
  the calculation of said minimum number N of slots per frame on the basis of the ratio between the total bitrate required for the services and the bitrate allocated to a slot, and of the number M of frames in a super frame;

the calculation of the number p of frames of a super frame in which an additional slot is allocated, as a function of the difference R between the total bitrate required for the services and the bitrate allocated to N slots per frame;

the identification of the N*M+p slots to be allocated in the super frame as a function of the rules for filling the frames defined by the formatting standard.

According to an implementation of the formatting method according to the invention, the step of allocating each of said identified slots to the transport of data of one of said services comprises an allocation successively slot by slot, the M frames in which the slots are allocated following one another in a predefined order, and for each service, the frame sequence in which the successive slots associated with said service must be allocated is defined and then each slot is allocated according to the previously defined frame sequence.

The sequence of frames is generally a non-monotonic function with respect to said predefined order. In this case, for at least two slots to be allocated successively from among all the slots to be allocated to said service, the second slot is allocated in a frame which precedes the frame in which the first slot is allocated.

According to an implementation of the formatting method according to the invention, during said allocating step, each new slot to be allocated is allocated systematically in a different frame from the frame in which the previous slot has been allocated. Stated otherwise, the allocation of a slot in a first frame is always followed by the allocation of a slot in a different frame from the first frame.

According to an implementation of the formatting method according to the invention, the step of allocating each of said identified slots to the transport of data of one of said services comprises the allocation of each slot of one and the same service in the following order from among the M frames:

as long as there remains a slot to be allocated:
define a frame t as initial frame T;
as long as the frame t exists {
if there remains at least one slot to be allocated, allocate a new slot of the frame t;
t=t+E(M/2);
if there remains at least one slot to be allocated, allocate a new slot in the frame t;
t=t+1;
}

E(t) being the function returning the integer part of t, the allocation of the slots within one and the same frame being performed in a predefined order.

This mode of allocation corresponds to a dispersed distribution of the slots of one and the same service. The predefined order of allocation of the slots within one and the same frame is generally the same for all the frames. For ATSC-MH, this is the order explained above with regard to FIG. 2.

According to an implementation of the formatting method according to the invention, at least one frame from among the M frames comprises a slot not allocated to one of said services to be transported, at least one other from among the M frames comprising a slot allocated to one of said services and for which the position of the allocated slot is identical to that of said unallocated slot, the method comprising a step of assigning opportunistic data to said unallocated slot.

According to an implementation of the formatting method according to the invention, each of the M frames comprises at least, at the same position in each of said frames, one slot not allocated to one of said services to be transported, the method comprising a step of assigning so-called legacy data to at least one of said unallocated slots.

The subject of the invention is also a device for formatting streams according to the ATSC-MH standard or a standard which is upward compatible with ATSC-MH, the device being able to receive a first stream of MPEG Transport Stream type comprising so-called legacy data and a second stream comprising data intended for mobile terminals, characterized in that the device is configured to implement the method such as described above to produce a TS stream.

The formatting device may, for example, be implemented by integrated circuits of ASIC (Application-Specific Integrated Circuit) type, programmable circuits of FPGA (Field-Programmable Gate Array) type, software or by a combination of these means of implementation.

The subject of the invention is also a video stream multiplexing device able to receive a plurality of streams of MPEG Transport Stream type, the device comprising an MPEG Transport Stream stream multiplexer fed by said plurality of streams, characterized in that it comprises a formatting device such as that described above fed on the one hand by said multiplexer, and on the other hand by an IP stream transporting data for a mobile video service arising from a video coder so as to produce a stream of MPEG Transport Stream type which complies with the ATSC-MH standard.

BRIEF DESCRIPTION OF THE DRAWINGS

Other characteristics will become apparent on reading the detailed description given by way of nonlimiting example which follows offered in relation to appended drawings which represent:

FIG. 1, an illustration of the structure of an M/H frame known from the prior art;

FIG. 2, an example of allocation of slots in an M/H frame according to the prior art;

FIGS. 4a, 4b and 4c, examples of allocation of slots for a series of frames transporting data associated with two different services, respectively according to the prior art, according to a first implementation of the method according to the invention and according to a second implementation of the method according to the invention;

FIGS. 5a, 5b and 5c, first examples of allocation of slots for a series of frames transporting data associated with four different services, respectively according to the prior art, according to a first implementation of the method according to the invention and according to a second implementation of the method according to the invention;

FIGS. 6a, 6b and 6c, second examples of allocation of slots for a series of frames transporting data associated with four different services, respectively according to the prior art, according to a first implementation of the method according to the invention and according to a second implementation of the method according to the invention;

MORE DETAILED DESCRIPTION

Figure 3:
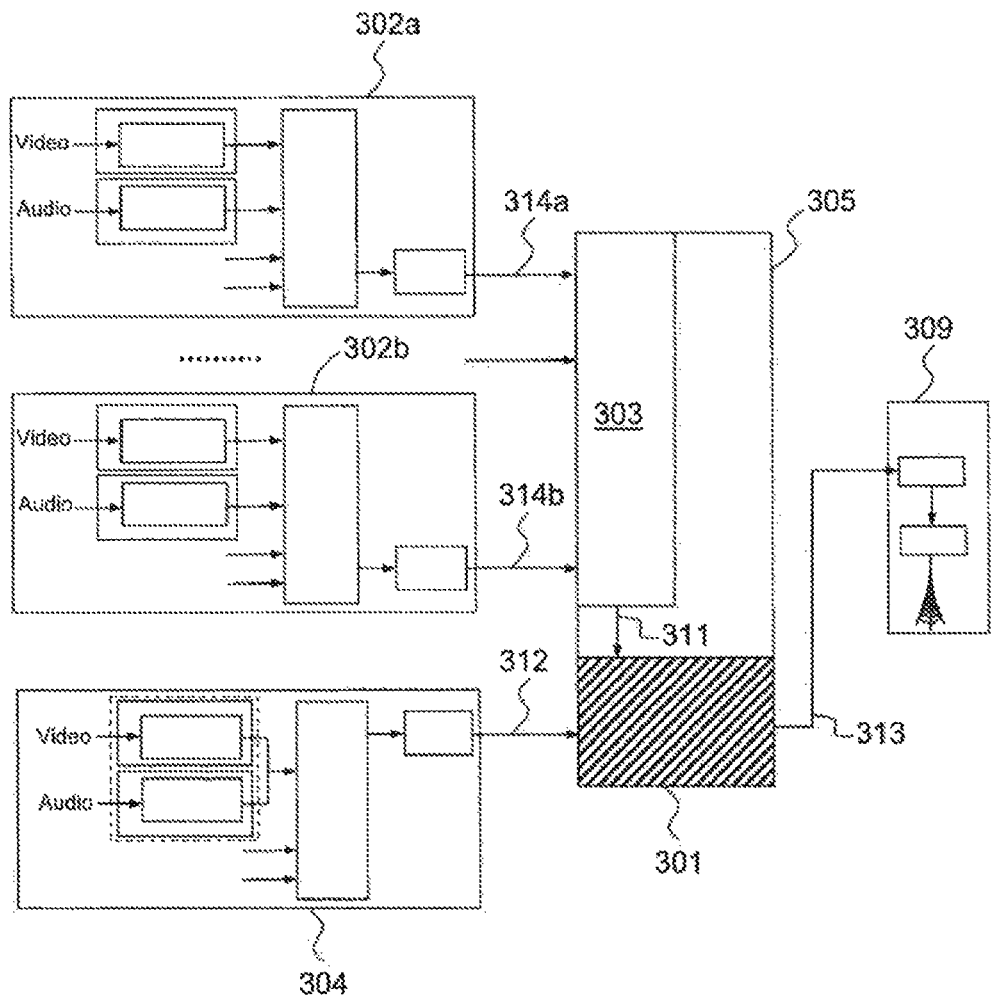
FIG. 3, a diagram illustrating a device implementing the method according to the invention for formatting an MPEG multiplexed stream.

FIG. 3 illustrates a device implementing the method according to the invention for formatting an MPEG multiplexed stream.

The device 301 is a device for formatting MH frames taking as input the IP stream 312 transporting data in respect of a mobile video service and for multiplexing these formatted MH frames with the MPEG-TS 311 ("Moving Picture Experts Group Transport Stream") stream and which produces as output an ATSC-MH video stream 313, this ATSC-MH video stream 313 being able to be broadcast thereafter, for example, by a system 309 able to modulate the stream and to broadcast it over the air. The device 301 therefore makes it possible to unite in one and the same channel legacy data to be broadcast to conventional terrestrial terminals and data intended for mobile terminals receiving the data through waves.

The MPEG-TS 311 stream can be produced by a TS stream ATSC multiplexer 303 that has aggregated several legacy data streams 314a, 314b arising from multiple video sources 302a, 302b. The IP stream 312 may originate from a video coder 304 suitable for the formats of mobile/handheld terminals. Advantageously, the ATSC multiplexer 303 and the device for formatting MH frames 301 are bundled in one and the same apparatus 305, called an ATSC-MH multiplexing device.

The method according to the invention which can be implemented in the device 301 is explained in regard to the figures which follow.

FIGS. 4a, 4b and 4c present examples of allocation of slots for a series of frames transporting data associated with two different services. FIG. 4a represents an allocation performed according to the prior art, FIG. 4b an allocation performed according to a first implementation of the method according to the invention and FIG. 4c an allocation performed according to a second implementation of the method according to the invention. Just as for FIG. 2, only one sub-frame of each frame is represented.

FIG. 4a, which illustrates a conventional allocation scheme, shows that the allocation of the slots from one frame to another is unchanged. By "allocation scheme" is meant a definition making it possible to establish which are, for each MH frame, the slots allocated to the transport of MH data and, for each of these slots, the service with which it is associated. In the example, the two services each occupy two slots per sub-frame for each of the frames. In the figure, each frame is represented by a line numbered from 1 to 6, the slots being represented by a splitting of the line and numbered from 0 to 15. A single sub-frame per frame is represented, it being understood that all the sub-frames exhibit the same allocation pattern as imposed by the standard. Subsequently the method of formatting a stream of data according to the various embodiments of the invention is explained in respect of a sub-frame, it being understood that it applies in an identical manner in respect of all the sub-frames of a frame, as imposed by the standard.

FIG. 4b presents a first mode of allocation established by a method according to the invention, in which an allocation scheme is chosen, not over the space occupied by a single frame, but over the space occupied by M frames, M being equal to 6 in the example. Thus, the set of 6 frames constitutes an "MH super frame" within which it is possible to distribute the allocations of slots. The notion of super frame is not given substance by a header or any other modification of the structure of the stream; it constitutes a time interval in which an allocation scheme is established, which is thereafter repeated as long as the transmission needs do not evolve.

In the example, p MH frames from among the 6 frames comprise sub-frames in which N+1 slots are allocated to a given service and 6−p MH frames comprise sub-frames in which N slots are allocated to this service, so that the mean occupancy rate per sub-frame for this service, over the duration of a super frame, is equal to [p.(N+1)+(6−p).N]/6=N+p/6 with p varying from 0 to 5, N being equal to 2 in the example. Stated otherwise, by distributing the allocation of the slots over 6 frames, it is possible to attain intermediate bitrate levels and to perform bitrate jumps of ⅙ of the bitrate jump corresponding to an additional slot per sub-frame, while complying with the constraints imposed by the ATSC-MH standard. This corresponds in the example to a jump of the order of 150 Kbits/s per transported service instead of about 1 Mbit/s, which may thus lead, when p=1, to gaining about 750 Kbits/s of useful bitrate per service compared to the conventional methods. In the general case of a super frame composed of M frames, the mean occupancy rate is equal to N+p/M, with p varying from 0 to M−1.

With respect to the allocation scheme of FIG. 4a, the number of slots allocated per sub-frame and per service in the example of FIG. 4b is not equal to 2 but is, on average, equal to 1+2/6, thereby corresponding to a total bitrate gain approximately equal to 1.2 Mbits/s when the gains obtained for each of the services are added together.

The method according to the invention thus makes it possible, by offering the possibility of allocating a non-integer mean number of slots while complying with the specifications of the ATSC-MH standard, to increase the fineness of tailoring of the bitrate allocated to a service. This fineness is equal, in Mbits/s, to about 1/M, M being the number of frames considered in the super frame, stated otherwise the number of frames on which the allocation scheme is determined. The method according to the invention thus allows more precise tailoring to the bitrate needs for each service.

In the example, the slots are allocated in the super frame in the following order: $1^{st}$ frame, $4^{th}$ frame, $2^{nd}$ frame, $5^{th}$ frame, $3^{rd}$ frame, $6^{th}$ frame, in such a way as to distribute the slots allocated to one and the same service relatively uniformly over the super frame so as to spread the data specific to a given service. This spreading makes it possible notably to dilute the entropy related to a service and thus facilitate the correction of errors that may occur during transmission. According to the example illustrated in FIG. 4b, the slots associated with the first service A are firstly allocated in the following order: (frame 1, slot 0), (frame 4, slot 0), (frame 2, slot 0), (frame 5, slot 0), (frame 3, slot 0), (frame 6, slot 0), (frame 1, slot 4), (frame 4, slot 4). Thereafter, the slots associated with the second service B are allocated in the following order: (frame 2, slot 4), (frame 5, slot 4), (frame 3, slot 4), (frame 6, slot 4), (frame 1, slot 8), (frame 4, slot 8), (frame 2, slot 8), (frame 5, slot 8).

The receivers of the ATSC-MH streams, for example smartphones (also sometimes called "intelligent telephones"), can determine to which services the slots are allocated, by virtue of signaling data present in each slot, these data describing the allocation of the slots to the service for the frame in progress or the following frame. The receivers implementing this signaling function can therefore adapt dynamically to each new frame received.

FIG. 4c presents a second mode of allocation established by a method according to the invention. The slots allocated to the transport of MH data are the same as those previously illustrated in FIG. 4b. However, the distribution of the services in the allocated slots is different. In contradistinction to the distribution adopted in FIG. 4a with a view to spreading as far as possible the information associated with one and the same service, the distribution adopted in FIG. 4c is aimed at bundling the slots associated with one and the same service. This distribution produces time intervals during which no slot associated with a service is transmitted, thereby permitting the receiver of this service to turn itself off during these intervals. Notably, the signaling data decoding receiver can determine whether the following MH frame contains at least one slot associated with a given service. If not, the receiver can make it turn off for the duration of a frame.

In the example, slots 0, 4, 8 of frame 1 and of frame 4 are allocated to the first service A, as is slot 0 of frame 2 and of frame 5. Slots 4 and 8 of frame 2 and of frame 5 are allocated to the second service B, as are slots 0 and 4 of frame 3 and 6. Thus, frames 3 and 6 do not comprise any slot allocated to the first service A and frames 1 and 4 do not comprise any slot allocated to the second service B. Consequently, a receiver configured to receive the first service A can be momentarily deactivated during the time that frames 3 and 6 are being received. It can thus decrease its energy consumption by about 33%. Similarly, a receiver configured to receive the second service B can be deactivated during the time that frames 1 and 4 are being received.

Figures 5A, 5B, 5C:
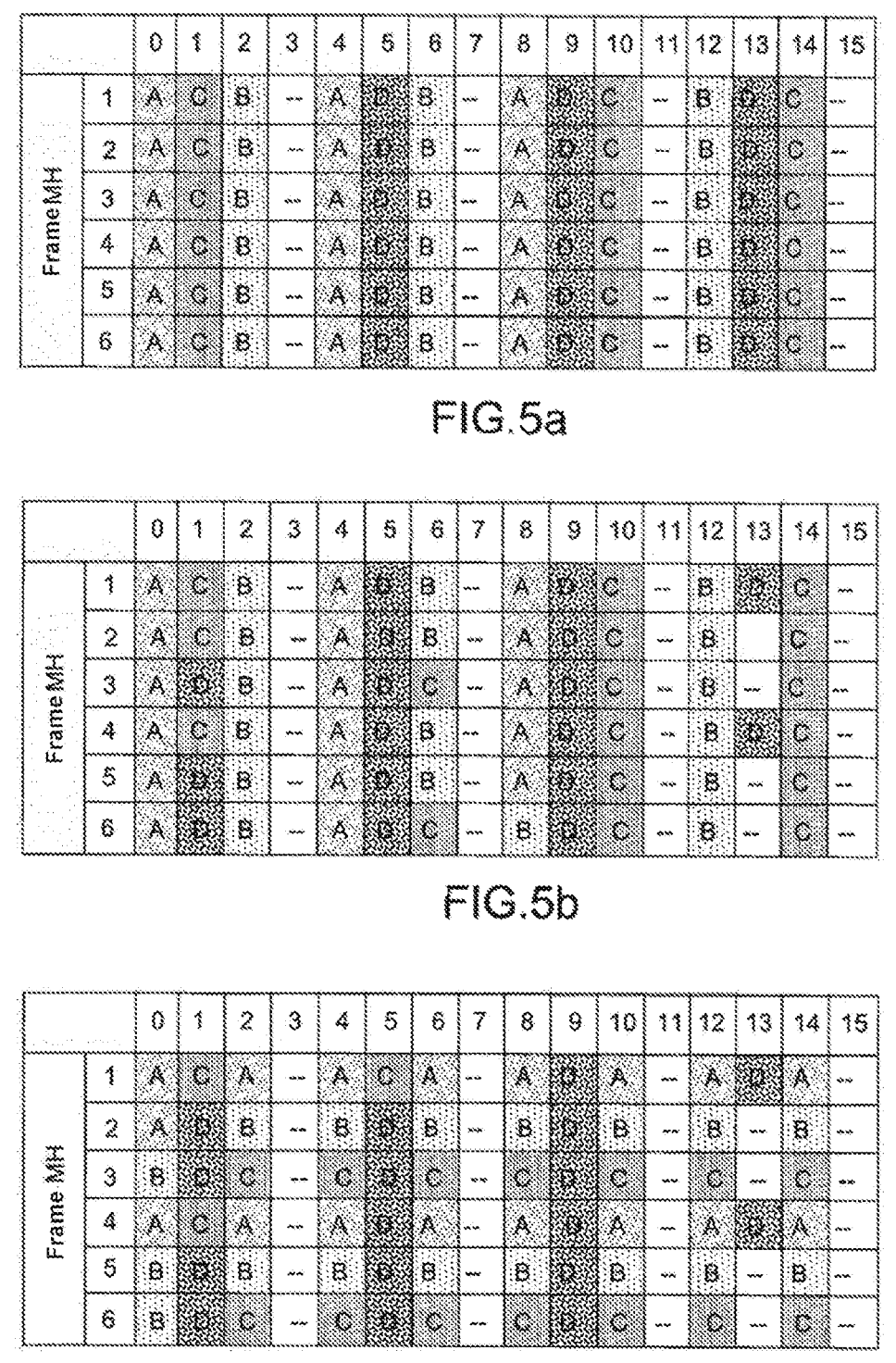

FIGS. 5a, 5b and 5c present first examples of allocation of slots for a series of frames transporting data associated with four different services. FIG. 5a represents an allocation performed according to the prior art, FIG. 5b an allocation performed according to a first implementation of the method according to the invention and FIG. 5c an allocation performed according to a second implementation of the method according to the invention. Each of the services, denoted A, B, C, D occupies the same number of slots as the other services for each example illustrated respectively in FIGS. 5a, 5b and 5c.

FIG. 5a illustrates a conventional mode of allocation in which all the frames are assigned an identical allocation. Each service A, B, C, D occupies three columns of slots, so that the total bitrate required for the transmission of the MH data is approximately equal to 12 Mbits/s.

FIG. 5b presents a first mode of allocation established by a method according to the invention, in which only 2+5/6 slots are used on average per frame and per service. This mode of allocation makes it possible to release four additional free slots, which in the example, are the following slots: (frame 2, slot 13), (frame 3, slot 13), (frame 5, slot 13), (frame 6, slot 13). These freed slots can be used to place so-called opportunistic data, for example data allowing the updating of the software of receivers of legacy or mobile type, the loading of advertisements, of films, or of digitized books. Thus, the method allows, in the example, a gain of about 600 Kbits/s.

FIG. 5c presents a second mode of allocation established by a method according to the invention. The slots allocated to the transport of MH data are the same as those previously illustrated in FIG. 5b. However, the distribution of the services in the allocated slots is different. As in FIG. 4c, the slots allocated to one and the same service are grouped together. Thus, frames 3, 5 and 6 do not comprise any slot associated with the first service A, frames 1 and 3 do not comprise any slot associated with the second service B and frames 2 and 5 do not comprise any slot associated with the third service C. Consequently, the terminals configured to receive the first service A only can be deactivated for 50% of the time, while the terminals configured to receive the second service B or exclusively the third service C can be deactivated for 33% of the time. As regards the terminals configured to receive the fourth service D, they cannot be deactivated since each of the frames comprises at least one slot allocated to this service.

Figures 6A, 6B, 6C:
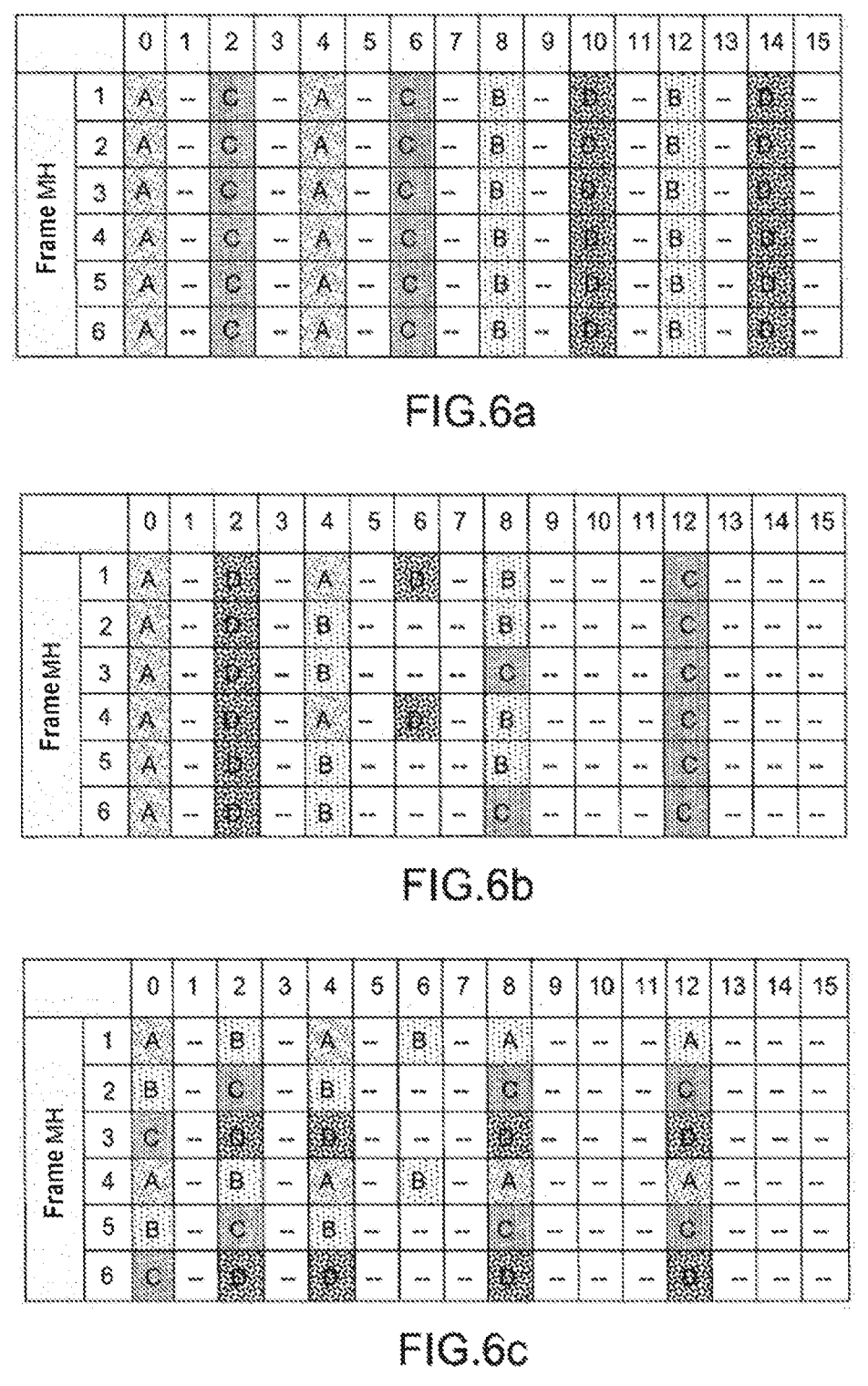

FIGS. 6a, 6b and 6c present second examples of allocation of slots for a series of frames transporting data associated with four different services. FIG. 6a represents an allocation performed according to the prior art, FIG. 6b an allocation performed according to a first implementation of the method according to the invention and FIG. 6c an allocation performed according to a second implementation of the method according to the invention. The gains obtained by the method are yet more significant in the examples of FIGS. 6b and 6c than in the first examples of FIGS. 5b, 5c.

In the conventional mode of allocation, illustrated in FIG. 6a, each of the four services occupies two full columns of slots per sub-frame, thus corresponding to an approximate bitrate of 8 Mbits/s.

According to a first mode of allocation arising from the method according to the invention and illustrated in FIG. 6b, each of the four services occupies 1+2/6 slots per sub-frame for each frame. Hence, about 2.5 Mbits/s are freed to transport other data. Notably, by virtue of this allocation, two complete columns of slots (No. 10 and No. 14) per sub-frame are freed in the example—stated otherwise, none of the slots bearing the numbers 10 and 14 are allocated—; consequently, these slots can be used to transmit legacy data, the bitrate of the legacy data having to be constant over time, stated otherwise the legacy data occupy complete columns of slots in a super frame. The other four slots freed in column 6 of each sub-frame can be used to transmit opportunistic data.

The second mode of allocation arising from the method according to the invention and illustrated in FIG. 6c proposes a distribution of the slots which is able to allow the temporary turning off for 66% of the time of the mobile terminals configured to receive one of the services A or D and for 50% for the mobile terminals configured to receive one of the services B or C.

Figure 7:
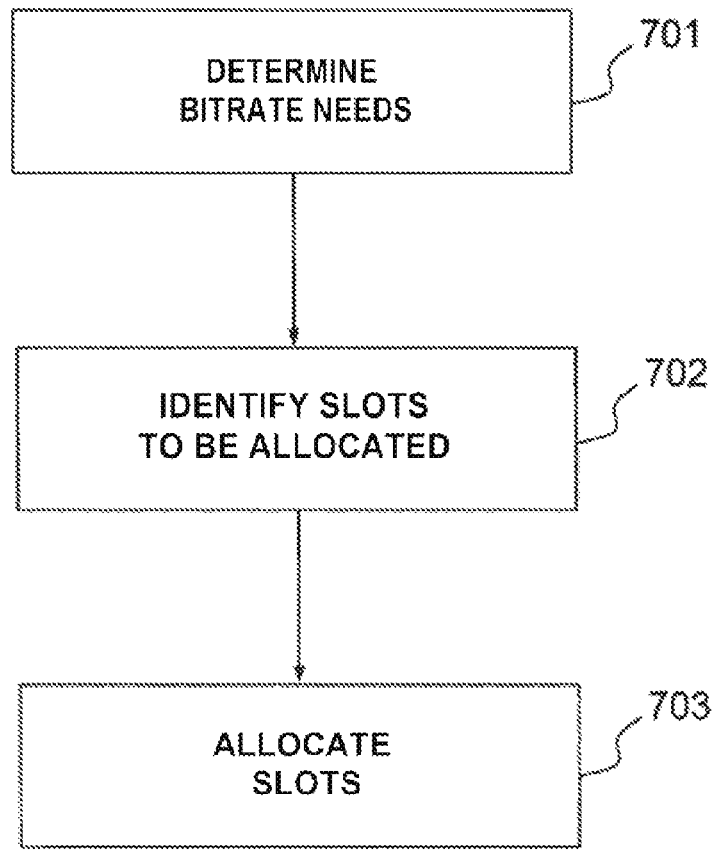
FIG. 7, an illustration of the steps executed by an exemplary method according to the invention.

FIG. 7 presents the steps executed by an exemplary method according to the invention. The method according to the invention can be implemented in the following manner: firstly 701, the bitrate needs are determined for each service, and then secondly 702, an allocation pattern on M frames is chosen which makes it possible to meet the total bitrate need required for all the services, said pattern defining which slots will be allocated in each sub-frame, and then thirdly 703, it is determined which services will be associated with the allocated slots, for example by spreading the information corresponding to one and the same service or on the contrary by concentrating it, these differences being illustrated by comparing FIGS. 4b and 4c.

According to an implementation of the method according to the invention, the choice of the allocation pattern 702, that is to say the identification of the slots which must be allocated to a service, comprises the calculation of the minimum number of slots per sub-frame for all the frames of the super frame. This calculation can be performed as follows: $N_{tot}=E(Bitrate_{total}/Bitrate_{slot})$, where E is a function returning the integer part of the total. operand, $Bitrate_{total}$ is the total bitrate need (all services inclusive) over the horizon of a super frame, $Bitrate_{slot}$ is the bitrate corresponding to the allocation of one slot per sub-frame, that is to say the minimum bitrate jump per frame (equal to about 1 Mbit/s for the MH frames), and where $N_{tot}$ is the minimum number of slots to be allocated over a super frame.

The minimum number N, such as defined in the preceding example of FIG. 4b, of slots allocated per frame is therefore equal to $N=E(N_{tot}/M)$.

There therefore remains $R=Bitrate_{total}-N*M*Bitrate_{slot}$ of bitrate to be passed into the super frame. It is therefore appropriate to choose the dimension M of the super frame, stated otherwise the number M of frames on which the bitrate balance R must be transmitted, M necessarily being greater than 1. M can be chosen arbitrarily so as to satisfy a compromise between advantages afforded by the fineness of the bitrate jumps and constraints related to an increase in the dimension of the super frame (increase in the size of the buffer memories used to store the data to be transmitted, latency time, etc.).

It is also appropriate to determine, over the whole super frame, the number p of slots to be allocated in addition to the N slots per frame. The number p, defined previously in support of FIG. 4b as the number of frames comprising N+1 slots allocated among the M frames of a super frame is also equal to the number of slots to be allocated in the super frame in addition to the N slots per frame.

The integer number p must be at least equal to $E_{sup}(R./Bitrate_{slot})$ ($E_{sup}(x)$ being the greater integer part of x) so as to ensure the transmission of the entire bitrate $Bitrate_{total}$. Advantageously, p is the smallest integer greater than or equal to $E_{sup}(R./Bitrate_{slot})$. In any eventuality, p is less than M. The number p can be equal to 0 if $Bitrate_{total}$ corresponds to the bitrate required for several services and if $Bitrate_{total}$ is a multiple of M. $Bitrate_{slot}$. This case corresponds to a situation in which each service taken separately is assigned a bitrate need which is not a multiple of $M.Bitrate_{slot}$, but in which the services taken in combination are assigned a bitrate need which is a multiple of $M.Bitrate_{slot}$. This case would arise in the example of FIG. 4b if in frames 3 and 6, slot 8 were allocated to the second service B. On the contrary, if each of the services transported is assigned a bitrate need which is a multiple of M. $Bitrate_{slot}$, then a conventional allocation is performed, with no need to resort to the method according to the invention.

Advantageously, it is possible to choose M such that $Bitrate_{total}$ is very close to $Bitrate_{slot}*(M.N+p)$, so as to tailor the allocation as nearly as possible to the bitrate needs.

To return to the examples of FIGS. 4b and 4c, by considering that $Bitrate_{total}=15.6$ Mbits/s, and by taking the approximate assumption of $Bitrate_{slot}=1$ Mbit/s to simplify the example, then N=2, R=3.6 Mbit/s, M=6, and p=4.

Once the numbers M, N and p have been determined, the method identifies the slots to be allocated. This identification depends on the rules for filling the frames defined by the formatting standard. In the case of ATSC-MH, and as already recalled above, the order of filling of each frame is the following, by slot number: 0, 4, 8, 12, 2, 6, 10, 14, 1, 5, 9, 13, 3, 7, 11, and then 15.

Once the identification of the slots which are reserved for the transport of data of MH type has been performed, the step 703 of allocating each of said identified slots to the transport of data of one of said services can take several forms according to the mode of distribution chosen. In the case where the distribution of the slots to one and the same service must be dispersed, then the allocation of the slots of this service is performed in the following order: frame t, frame t+E(M/2), frame t+1, frame t+1+E(M/2), frame t+2, frame t+2+E(M/2) . . . etc until the frame number no longer exists, in which case the allocation resumes at the initial frame t until there are no longer any slots to be allocated. E(t) is the function returning the integer part of t.

Figure 8:
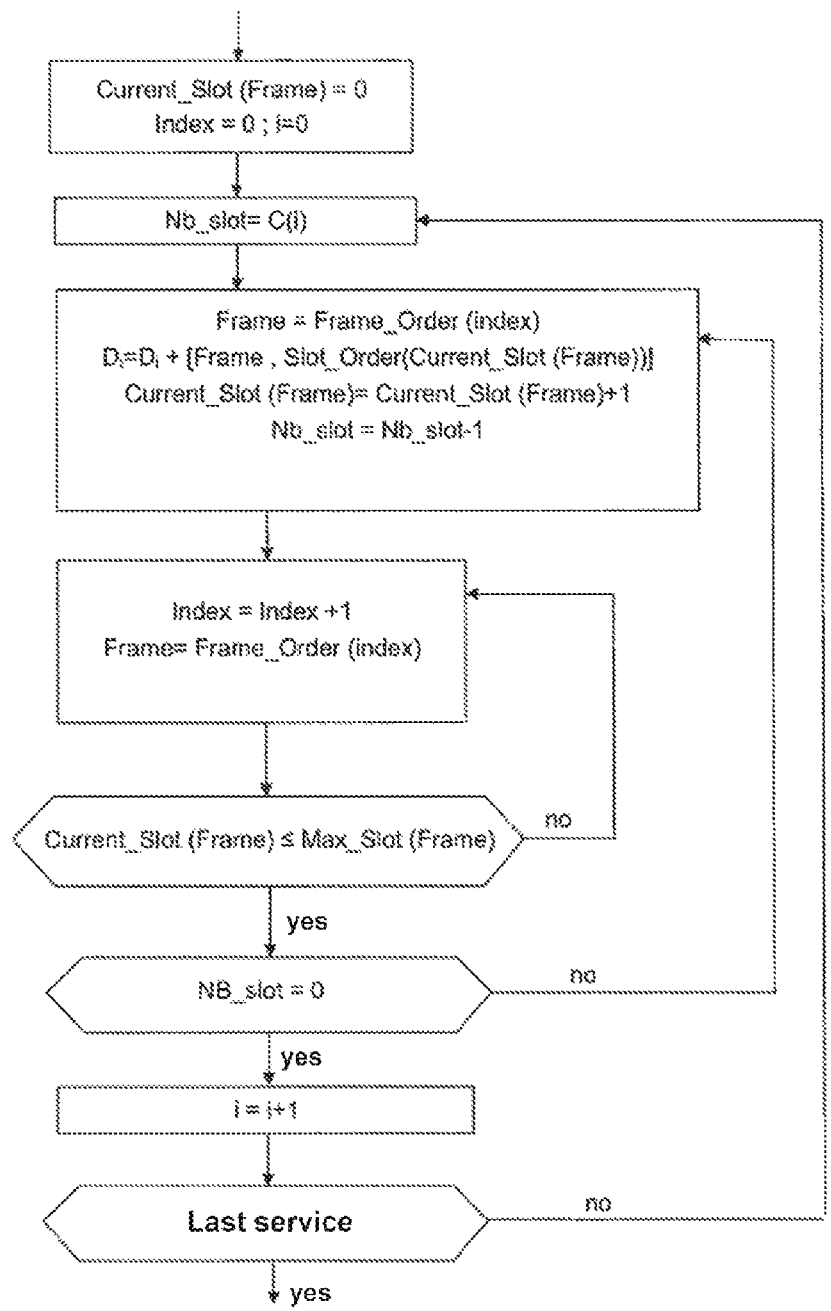
FIG. 8, an exemplary allocation method used by the method according to the invention.

The allocation 703 can be performed, for example, with the aid of the method described hereinafter and with regard to FIG. 8. We denote by p the number of MH frames among the M frames, which comprise sub-frames in which N+1 slots are allocated to a given service, where N is the minimum number of slots per sub-frame for all the frames, M being the number of frames in the super frame. We also denote by:

C(i) the number of slots necessary to transmit the service of index i in the super frame. The sum of all the C(i) gives the total number of slots occupied in the super frame;

Max_Slot(Frame) the maximum number of slots used in the sub-frames belonging to the frame of index Frame, with 0≤Frame≤M−1, if Frame<p then Max_Slot(Frame)=N+1, if Frame≥p then Max_Slot(Frame)=N;

Slot_Order (k)=(0,4,8,12,2,6,10,14,1,5,9,13,3,7,11,15), an array giving the order, such as defined by the standard, of use of the slots in a sub-frame;

Frame_Order(k): $(a_0, a_1, \ldots, a_k, \ldots, a_{16*M-1})$. Table of 16 (16 being the number of slots per sub-frame in ATSC-MH) times M elements defining the order in which the frames must be filled. To be consistent this table must be such that: $0 \le a_k \le M-1$, and for all j from 0 to M−1, 16 $a_k$ are equal to j;

$D_i=[(T_0,S_0), (T_1,S_1), \ldots, (T_{C(i)-1}, S_{C(i)-1})]$: a table per service storing the slots allotted to the transmission of the service of index i ($T_i$: frame number, $S_i$ slot number).

—Begin Method—
For every Frame from 0 to M−1, Current_Slot(Frame)=0
i=0
index=0
EXECUTE LOOP 1 (loop traversing each of the services)
Nb_slot=C(i)
   EXECUTE LOOP 2 (slot by slot allocation)
   Frame=Frame_Order (index)
   Di=Di+[Frame, Slot_Order(Current_Slot(Frame))] (addition of a pair (frame, slot No. in the table of the service of index i) Current_Slot(Frame)=Current_Slot(Frame)+1
   Nb_slot=Nb_slot−1
   EXECUTE
   index=index+1
   Frame=Frame_Order (index)
   WHILE Current_Slot(Frame)≤Max_Slot(Frame)
   LOOP 2 WHILE Nb_slot is different from 0
i=i+1
LOOP 1 WHILE the index i does not correspond to the last service
—END METHOD—

Thus, the allocations described in FIGS. 4b, 5b and 6b (dispersed distribution mode) can be obtained with:
Frame_Order(k)=(0,3,1,4,2,5,0,3,1,4,2,5,
0,3,1,4,2,5,0,3,1,4,2,5,
0,3,1,4,2,5,0,3,1,4,2,5,
0,3,1,4,2,5,0,3,1,4,2,5,
0,3,1,4,2,5,0,3,1,4,2,5,
0,3,1,4,2,5,0,3,1,4,2,5,
0,3,1,4,2,5,0,3,1,4,2,5,
0,3,1,4,2,5,0,3,1,4,2,5).

The allocations described in FIGS. 4c, 5c and 6c (concentrated distribution mode) can be obtained with:
Frame_Order(k)=(0,3,0,3,0,3,0,3,0,3,0,3,0,3
1,4,1,4,1,4,1,4,1,4,1,4,1,4,
2,5,2,5,2,5,2,5,2,5,2,5,2,5,
0,3,0,3,0,3,0,3,0,3,0,3,0,3,
1,4,1,4,1,4,1,4,1,4,1,4,1,4,
2,5,2,5,2,5,2,5,2,5,2,5,2,5)

The array Frame_Order can thus be modified according to the advantages that one desires to obtain (gain in bitrate, reduction in consumption of the receivers, better equilibrium between the bitrates allocated to legacy and to MH, etc.).

An advantage of the method of video stream formatting according to the invention is that it can be implemented in receivers without incompatibility with the ATSC-MH standard.

The invention claimed is:

1. A method of formatting a stream of data for mobile terminals according to a series of frames which comply with the ATSC-MH standard or with a standard which is upward compatible with ATSC-MH, a frame comprising a predetermined number of slots, each slot being able to be allocated to the transport of data associated with a service, said method comprising a step of defining a slots allocation pattern making it possible to meet a total bitrate need required for the services for a set, called a super frame, grouping together M frames, M being greater than 1, consisting in:

Allocating a minimum number N of slots for each frame of a super frame as a function of the total bitrate need and of the bitrate allocated to a slot, Allocating an additional slot in a predetermined number p of frames of a super frame, so as to comply with the total bitrate need with a minimum bitrate stepsize equal to the bitrate allocated to a slot.

2. The method of formatting of claim 1, in which the method comprises the following steps:

determining the bitrate needs for each service to be transmitted in the stream, identifying, as a function of the total bitrate need required for the set of said services, slots to be allocated to the transport of data of at least one of said services in each frame of a super frame, allocating each of said identified slots to the transport of data of one of said services.

3. The method of formatting a stream of data for mobile terminals of claim 2, in which the step of identifying the slots to be allocated comprises:

the calculation of said minimum number N of slots per frame on the basis of the ratio between the total bitrate required for the services and the bitrate allocated to a slot, and of the number M of frames in a super frame, the calculation of the number p of frames of a super frame in which an additional slot is allocated, as a function of the difference R between the total bitrate required for the services and the bitrate allocated to N slots per frame, the identification of the N*M+p slots to be allocated in the super frame as a function of the rules for filling the frames defined by the formatting standard.

4. The method of formatting a stream of data for mobile terminals of claim 1, in which the step of allocating each of said identified slots to the transport of data of one of said services comprises an allocation successively slot by slot, the M frames in which the slots are allocated following one another in a predefined order, in which for each service, the frame sequence in which the successive slots associated with said service must be allocated is defined and then each slot is allocated according to the previously defined frame sequence.

5. The method of formatting a stream of data for mobile terminals of claim 4, in which during said allocating step, each new slot to be allocated is allocated systematically in a different frame from the frame in which the previous slot has been allocated.

6. The method of formatting a stream of data for mobile terminals of claim 1, in which the step of allocating each of said identified slots to the transport of data of one of said services comprises the allocation of each slot of one and the same service in the following order from among the M frames:

as long as there remains a slot to be allocated:
  define a frame t as initial frame T;
  as long as the frame t exists {
  if there remains at least one slot to be allocated, allocate a new slot of the frame t;
  t=t+E(M/2);
  if there remains at least one slot to be allocated, allocate a new slot in the frame t;
  t=t+1;
  }

E(t) being the function returning the integer part of t, the allocation of the slots within one and the same frame being performed in a predefined order.

7. The method of formatting a video stream of claim 1, wherein at least one frame from among the M frames comprises a slot not allocated to one of said services to be transported, at least one other from among the M frames comprises a slot allocated to one of said services and for which the position of the allocated slot is identical to that of said unallocated slot, said method comprising a step of assigning opportunistic data to said unallocated slot.

8. The method of formatting a video stream of claim 1, wherein each of the M frames comprises at least, at the same position in each of said frames, one slot not allocated to one of said services to be transported, said method comprising a step of assigning so-called legacy data to at least one of said unallocated slots.

9. A device for formatting streams according to the ATSC-MH standard or a standard which is upward compatible with ATSC-MH, the device being able to receive a first stream of MPEG Transport Stream type comprising so-called legacy data and a second stream comprising data intended for mobile terminals, wherein the device is configured to implement defining a slots allocation pattern making it possible to meet a total bitrate need required for the services for a set, called a super frame, grouping together M frames, M being greater than 1, consisting in:

Allocating a minimum number N of slots for each frame of a super frame as a function of the total bitrate need and of the bitrate allocated to a slot, Allocating an additional slot in a predetermined number p of frames of a super frame, so as to comply with the total bitrate need with a minimum bitrate stepsize equal to the bitrate allocated to a slot.

10. A video stream multiplexing device able to receive a plurality of streams of MPEG Transport Stream type, the device comprising an MPEG Transport Stream stream multiplexer fed by said plurality of streams, said device comprising a formatting device of claim 9, fed on the one hand by said multiplexer and on the other hand by an IP stream transporting data for a mobile video service arising from a video coder so as to produce a stream of MPEG Transport Stream type which complies with the ATSC-MH standard.

* * * * *